(12) United States Patent
Sureka

(10) Patent No.: US 12,737,373 B2
(45) Date of Patent: Sep. 15, 2026

(54) INTERFACING AN APPLICATION WITH A SUBSURFACE DATA PLATFORM

(71) Applicant: Schlumberger Technology Corporation, Sugar Land, TX (US)

(72) Inventor: Atul Sureka, Pune (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/447,591

(22) Filed: Aug. 10, 2023

(65) Prior Publication Data

US 2026/0161656 A1 Jun. 11, 2026

(51) Int. Cl.

| | |
|---|---|
| ***G06F 17/00*** | (2019.01) |
| ***G06F 7/00*** | (2006.01) |
| ***G06F 16/21*** | (2019.01) |
| ***G06F 16/25*** | (2019.01) |

(52) U.S. Cl.
CPC .......... *G06F 16/252* (2019.01); *G06F 16/211* (2019.01)

(58) Field of Classification Search
CPC ............................ G06F 16/252; G06F 16/211
USPC .......................................................... 707/756
See application file for complete search history.

(56) References Cited

U.S. PATENT DOCUMENTS

| | | | | |
|---|---|---|---|---|
| 9,069,561 | B2 * | 6/2015 | Lewis | G06F 8/35 |
| 9,720,117 | B1 * | 8/2017 | Das | G01V 1/282 |
| 2018/0260258 | A1 * | 9/2018 | Wester | G06F 9/541 |
| 2020/0210857 | A1 * | 7/2020 | Goradia | G06F 16/252 |
| 2022/0292106 | A1 * | 9/2022 | Umay | G06F 16/211 |
| 2022/0358336 | A1 * | 11/2022 | Abolhasssani | G06F 18/24147 |

* cited by examiner

*Primary Examiner* — Pavan Mamillapalli
(74) *Attorney, Agent, or Firm* — Kyle R. Miiller

(57) ABSTRACT

Techniques for interfacing, using a view model, an application with a subsurface data platform are presented. The techniques include: storing a user interface mapping data file, where the user interface mapping data file defines correspondences between elements of a user interface of the application and view model attribute identifications; storing a source mapping data file, where the source mapping data file defines correspondences between the view model attribute identifications and data of the subsurface data platform; and invoking one or more view model services, where the invoking the one or more view model services fetches data from the subsurface data platform based on the source mapping data file, and where the invoking the one or more view model services populates at least one view model table, based on the user interface mapping file, with data fetched from the subsurface data platform and formatted for the user interface of the application.

18 Claims, 6 Drawing Sheets

APPLICATION UI

VIEW MODEL

SUBSURFACE DATA PLATFORM

202

210

204

LOOSE COUPLING

200

INTERFACING AN APPLICATION WITH A SUBSURFACE DATA PLATFORM

FIELD

This disclosure relates generally to storing and using subsurface data, such as well log data.

BACKGROUND

Various data platforms exist, such as the Open Subsurface Data Universe (OSDU) platform and the Cognite Data Fusion (CDF) platform. Such platforms provide data formatting and storage, along with a set of services, such as data ingestion, writing, and retrieving, e.g., in the form of an application program interface (API). CDF may be used in a variety of contexts, including for subsurface data. Another subsurface data platform is OSDU. OSDU is a standard data platform for the oil and gas industry. It standardizes data formats by providing a common language and structure for various types of subsurface data used in the industry, such as seismic, well, production, and reservoir data. A primary purpose of OSDU is to break silos. OSDU enables greater data interoperability and data sharing across the industry, which can lead to improved collaboration, innovation, and efficiency.

A software application within the oil and gas industry can be developed using the OSDU data platform as a foundation. In essence, this type of application may serve diverse workflows that are present to the oil and gas domain. Such an application may built directly on top of the OSDU platform, which results in tight coupling between the application and the OSDU data platform. The OSDU data platform is complex, hierarchical, and highly normalized. For example, data for a single well may be spread out among a number of objects, some of which may reference others. These complexities are passed to the application because of the direct integration of the application with the OSDU data platform. However, ideally, the user experience of the application should not be driven by a predefined data platform. Further, different applications built on same data platform, such as OSDU, may end up being forced to have similar UIs because of the common data platform/services, which is undesirable.

SUMMARY

According to various embodiments, a method of interfacing, using a view model, an application with a subsurface data platform is presented. The method is performed by a computer comprising a non-transitory persistent memory and an electronic processor communicatively coupled to the non-transitory persistent memory. The method includes: storing, in the non-transitory persistent memory, a user interface mapping data file, wherein the user interface mapping data file defines correspondences between elements of a user interface of the application and view model attribute identifications; storing, in the non-transitory persistent memory, a source mapping data file, wherein the source mapping data file defines correspondences between the view model attribute identifications and data of the subsurface data platform; and invoking, by the electronic processor, one or more view model services, wherein the invoking the one or more view model services fetches data from the subsurface data platform based on the source mapping data file, and wherein the invoking the one or more view model services populates at least one view model table, based on the user interface mapping file, with data fetched from the subsurface data platform and formatted for the user interface of the application.

Various optional features of the above embodiments include the following. The subsurface data platform may include an open subsurface data universe. The method may further include displaying, by the user interface of the application, data from the at least one view model table. The subsurface data platform may store data using hierarchal schemes, and the at least one view model table may include a flat file. The fetching data from the subsurface data platform may include flattening. The invoking the one or more view model services may fetch the data fetched from the subsurface data platform during runtime of the application without ever persistently storing the data fetched from the subsurface data platform. The method may further include persistently storing the data fetched from the subsurface data platform, wherein the application obtains the data fetched from the subsurface data platform from persistent storage after an initial execution of the application without fetching the data fetched from the subsurface data platform again. The source mapping data file may specify subsurface data platform query handling. The user interface of the application may be directly bound to the at least one view model table. The method may further include: defining a user experience for the user interface of the application; and generating the user interface mapping data file based on the user experience.

According to various embodiments, a non-transitory computer readable medium comprising instructions that, when executed by an electronic processor, configure the electronic processor to interface an application with a subsurface data platform, using a view model, by performing actions is presented. The actions include: invoking, by the electronic processor, one or more view model services, wherein the invoking the one or more view model services fetches data from the subsurface data platform based on a source mapping data file stored in a non-transitory persistent memory, wherein the source mapping data file defines correspondences between view model attribute identifications and data of the subsurface data platform, and wherein the invoking the one or more view model services populates at least one view model table, based on a user interface mapping file, with data fetched from the subsurface data platform and formatted for the user interface of the application, wherein the user interface mapping data file is stored in a non-transitory persistent memory, wherein the user interface mapping data file defines correspondences between elements of a user interface of the application and the view model attribute identifications.

Various optional features of the above embodiments include the following. The subsurface data platform may include an open subsurface data universe. The actions may further include displaying, by the user interface of the application, data from the at least one view model table. The subsurface data platform may store data using hierarchal schemes, and the at least one view model table may include a flat file. Fetching data from the subsurface data platform may include flattening. The invoking the one or more view model services may fetch the data fetched from the subsurface data platform during runtime of the application without ever persistently storing the data fetched from the subsurface data platform. The actions may further include persistently storing the data fetched from the subsurface data platform, wherein the application obtains the data fetched from the subsurface data platform from persistent storage after an initial execution of the application without fetching the data fetched from the subsurface data platform again. The source mapping data file may specify subsurface data platform query handling. The user interface of the application may be directly bound to the at least one view model table.

According to various embodiments, a system for interfacing, using a view model, an application with a subsurface data platform is presented. The system includes: a non-transitory persistent memory, wherein the non-transitory persistent memory stores a user interface mapping data file, wherein the user interface mapping data file defines correspondences between elements of a user interface of the application and view model attribute identifications, and wherein the non-transitory persistent memory stores a source mapping data file, wherein the source mapping data file defines correspondences between the view model attribute identifications and data of the subsurface data platform; and an electronic processor communicatively coupled to the non-transitory persistent memory, wherein the non-transitory persistent memory comprises instructions that, when executed by the electronic processor, configure the electronic processor to perform actions comprising: invoking, by the electronic processor, one or more view model services, wherein the invoking the one or more view model services fetches data from the subsurface data platform based on the source mapping data file, and wherein the invoking the one or more view model services populates at least one view model table, based on the user interface mapping file, with data fetched from the subsurface data platform and formatted for the user interface of the application.

Combinations, (including multiple dependent combinations) of the above-described elements and those within the specification have been contemplated by the inventors and may be made, except where otherwise indicated or where contradictory.

BRIEF DESCRIPTION OF THE DRAWINGS

Various features of the examples can be more fully appreciated, as the same become better understood with reference to the following detailed description of the examples when considered in connection with the accompanying figures, in which.

DESCRIPTION OF THE EXAMPLES

Reference will now be made in detail to example implementations, illustrated in the accompanying drawings. Wherever convenient, the same reference numbers will be used throughout the drawings to refer to the same or like parts. In the following description, reference is made to the accompanying drawings that form a part thereof, and in which is shown by way of illustration specific exemplary examples in which the invention may be practiced. These examples are described in sufficient detail to enable those skilled in the art to practice the invention and it is to be understood that other examples may be utilized and that changes may be made without departing from the scope of the invention. The following description is, therefore, merely exemplary.

Some embodiments use a view model to provide loose coupling between an application and a subsurface data platform, such as, by way of non-limiting examples, OSDU or CDF. The view model abstracts the complexity of the subsurface data platform, giving the application more flexibility to define and implement its workflows. The application is free to build a user interface (UI) according to business needs, without being constrained by the complexity of the subsurface data platform.

According to various embodiments, a view model allows for the development of UIs that are independent of the underlying data platform. This means that UIs can be designed and developed without requiring knowledge of the data platform, permitting developers to focus on creating a great user experience without being constrained by the subsurface data platform, for example.

Figures 1, 2:
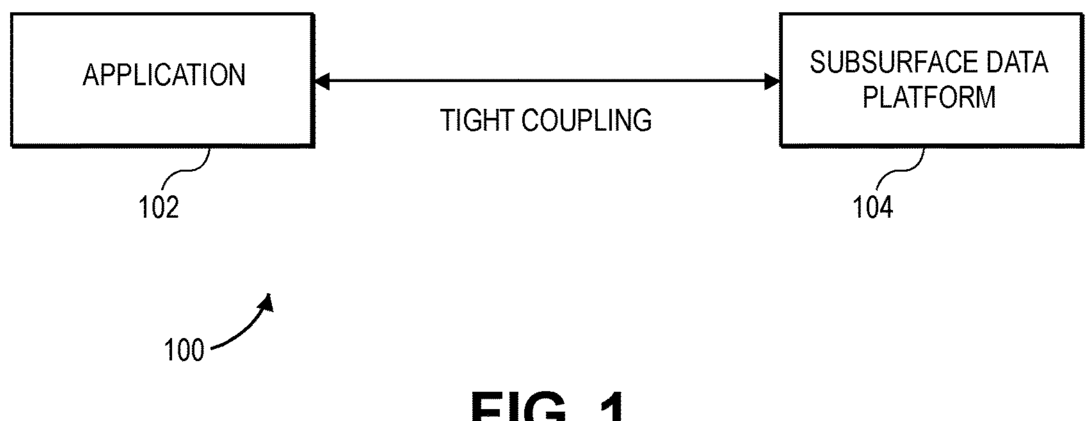
FIG. 1 is a schematic diagram illustrating tight coupling between an application and a subsurface data platform.
FIG. 2 is a schematic diagram of a system that uses a view model to provide loose coupling between an application and a subsurface data platform, according to various embodiments.

FIG. 1 is a schematic diagram 100 illustrating tight coupling between an application 102 and a subsurface data platform 104. By way of non-limiting example, the subsurface data platform 104 of FIG. 1 is described in reference to an OSDU data platform.

The OSDU data platform defines a common set of standards for different types of subsurface data used in the industry, including well data, well log data, seismic survey data, production data, reservoir data, basin data, field data, and perforation data. This standardization helps to ensure consistency and interoperability across different systems and applications that use subsurface data and makes it easier to share and exchange data between different organizations and stakeholders in the industry.

In the oil and gas industry, applications tend to be heavily reliant on data and are designed to support various workflows. However, building an application directly on top of the OSDU data platform could result in tight coupling between the application and the underlying data platform, which may limit the flexibility and agility of the application. Moreover, the end-user experience interface is largely driven by the OSDU data platform, which means that the user experience engineer must propose a UI that can be built using OSDU model/services. Consequently, the user experience may be limited and heavily influenced by OSDU data platform/services. In sum, the OSDU data platform itself forces tight coupling between the application 102 and the OSDU data platform.

FIG. 2 is a schematic diagram of a system 200 that uses a view model 210 to provide loose coupling between an application 202 and a subsurface data platform 204, according to various embodiments. The view model 210 provides a model for the user interface of the application 202. It acts as an intermediary layer between the user interface and the underlying subsurface data platform 204, providing a layer of abstraction that decouples the UI from the data platform. By way of non-limiting example, FIG. 2 is described in reference to an OSDU data platform.

While the OSDU data platform and its services provide a standardized data platform for the oil and gas industry, applications need not use them directly according to various embodiments. Instead, applications are free to build a UI as per their requirements. A view model, such as the view model 210, provides a layer of abstraction between the UI and the underlying subsurface data platform. This approach provides loose coupling between the application 202 and the subsurface data platform (e.g., OSDU).

Figure 3:
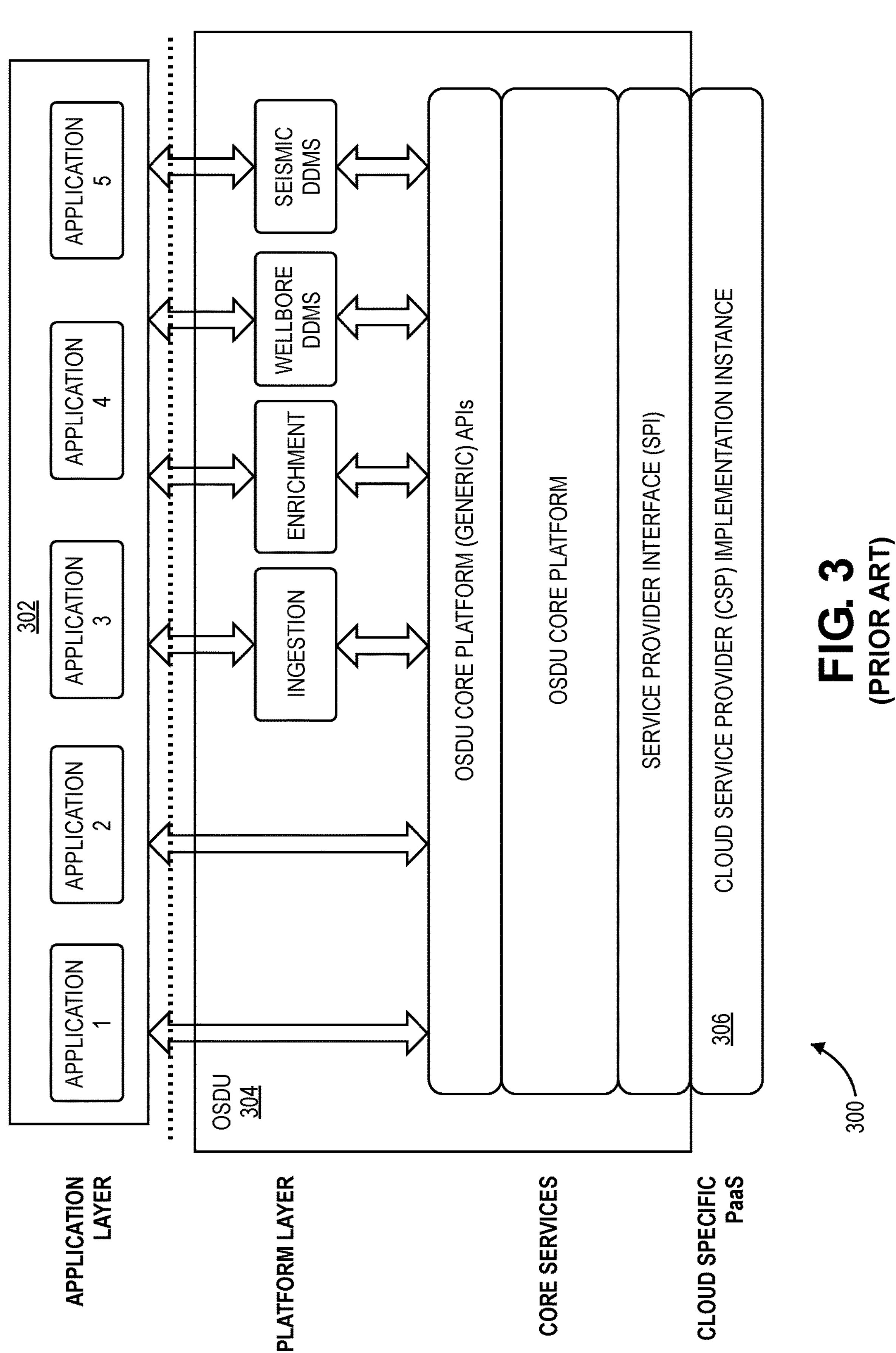
FIG. 3 is a high-level architecture diagram for OSDU.
Figure 4:
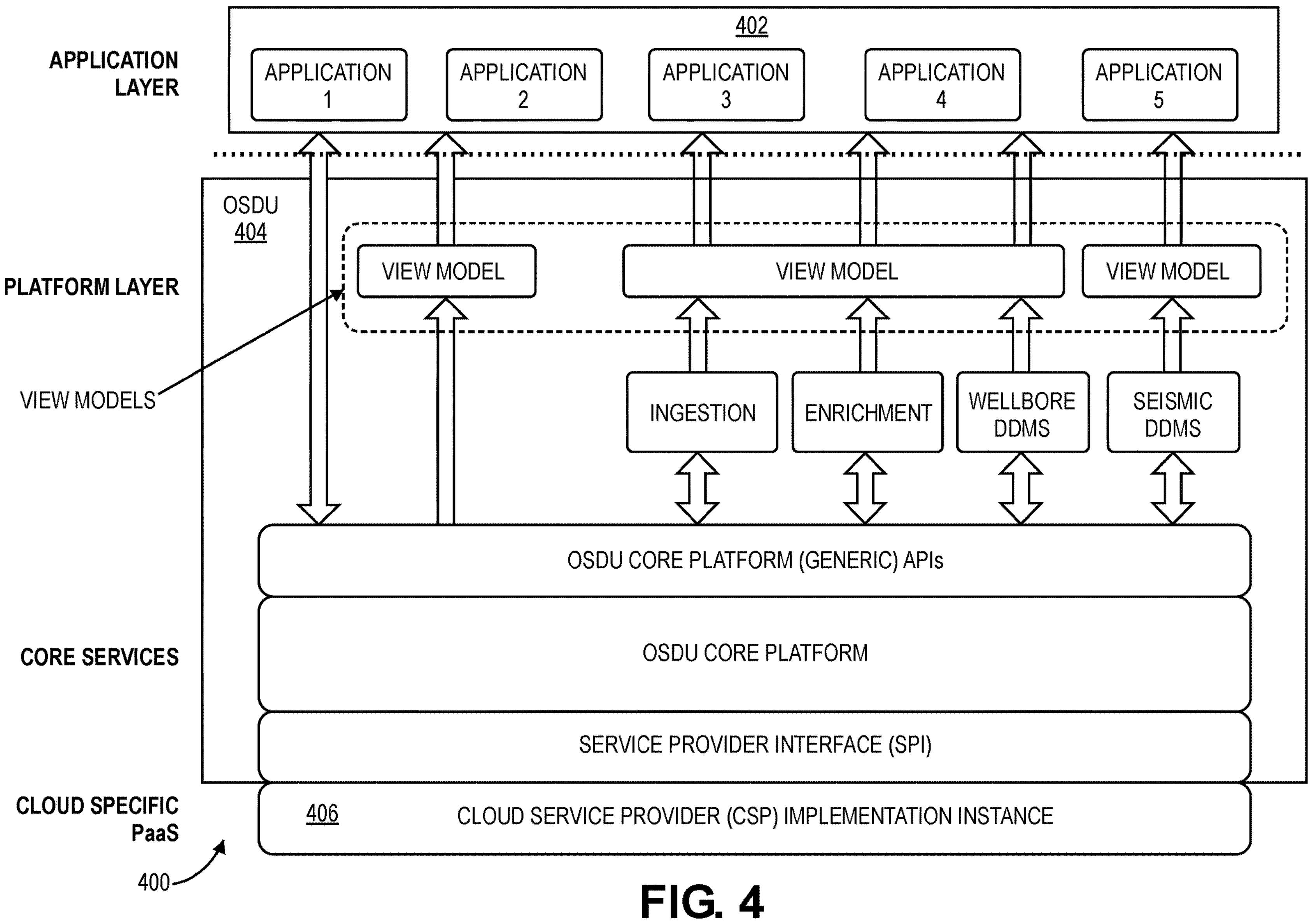
FIG. 4 is a high-level architectural diagram for OSDU with a view model, according to various embodiments.

By way of non-limiting example, embodiments are illustrated relative to the specific architecture of OSDU in reference to FIGS. 3 and 4. However, embodiments may be used with any subsurface data platform, not limited to OSDU.

FIG. 3 is a high-level architecture diagram 300 for OSDU. At the bottom of the diagram 300 is shown a cloud service provider implementation instance 306. The OSDU core platform 304 includes a set of core services like entitlement, storage, search, schema, file services etc. Data ingestion and enrichment services are platform services for data ingestion into OSDU, to enrich the data quality. Wellbore Domain Data Management Services and Seismic Domain Data Management Services are also provided. There are some helper/utility services like coordinate reference system (CRS) and unit conversion under the platform layer. At the top of the diagram 300 are shown applications 302.

FIG. 4 is a high-level architectural diagram 400 for OSDU with a view model, according to various embodiments. The view models act as a layer between the applications 402 and OSDU services, allowing an application to define a view model that supports the user interface (UI). A UI of an application can treat a view model as its data source. The view model provides the data in the format needed by the application. As shown in FIG. 4, the view models are shown as residing inside an OSDU instance 404 in order to convey that the view models are consistent with the OSDU standard. However, the view models may be developed and deployed independent from the specific subsurface data platform. For example, the view models may not form part of the OSDU standard and may be deployed outside of any particular ODSU software instance.

According to various embodiments, a single OSDU instance can have multiple view models to support various applications. A view model can be dedicated to an application, or it can be shared between applications. This depends on the applications' UIs. If two or more applications have similar UIs, then they can share the view model, for example. If an application has a more unique UI, it can have dedicated view model, for example.

Various embodiments may include a set APIs to manage the view model. For example, various APIs may be used to create a new view model, register a view model with an application, update a view model, or delete a view model.

According to various embodiments, the view model generates one or more flat tables that may be used to provide an interface for accessing data from the underlying data platform. Each table may have a set of fields/columns/attributes. Generally, the list of columns may be identified based on the user interface. In general, the flat tables may not include structures for indexing or recognizing relationships between records. Each record may be represented on a separate line in the tables. The tables may be, by way of non-limiting example, plain text (e.g., .csv, .txt, or .tsv). The tables may be accessed using the view model API, for example.

In the oil and gas industry, data can be broadly categorized into two types: metadata and actual data. Metadata typically includes a smaller set of attributes and is lightweight, whereas actual data can be very large in size, such as the logs data collected for subsurface analysis, which can range from GBs to TBs in size. Actual data is usually not modified over time and is mostly used for interpretation using various viewers, such as log viewers and trace viewers. By contrast, metadata may be subject to frequent updates.

Many applications work with metadata. An application may have to support many views, which may include many UI controls, such as tables, labels, buttons, checkboxes, facet filters, text boxes etc. A view model according to various embodiments works very well with such data and with a user interface developed using these controls. For actual data, one can continue using different viewers like trace viewers and/or log viewers.

A view model may support sorting and/or querying/filtering the underlying data of the subsurface data platform. Filtering the data can be simple, or be based on a complex query. Thus, a view model may have functionality, e.g., available through an API, to search/filter data.

Figure 5:
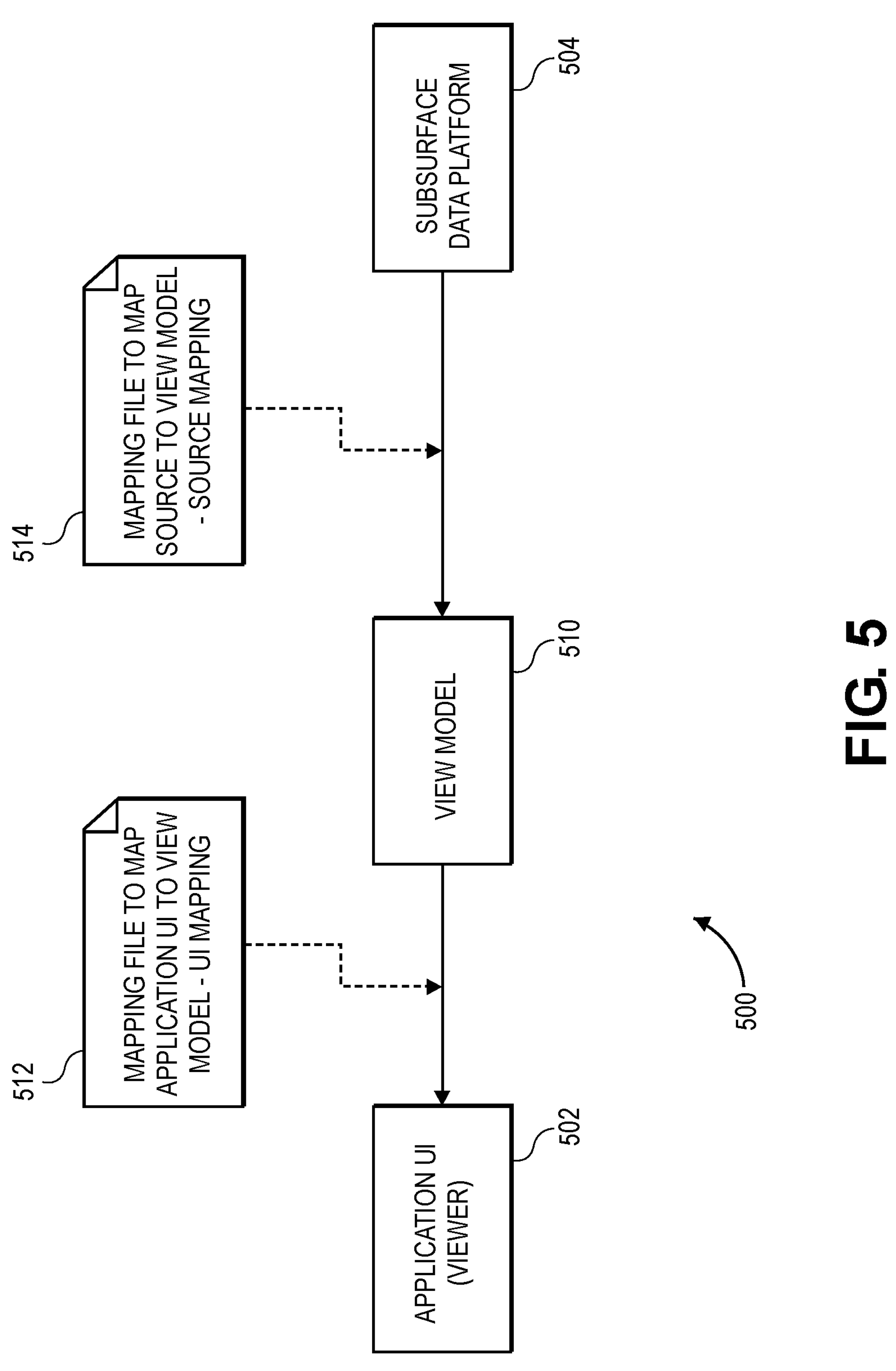
FIG. 5 is a schematic diagram of a subsurface data system that includes a user interface mapping data file and a source mapping data file, according to various embodiments.

FIG. 5 is a schematic diagram of a subsurface data system 500 that includes a user interface mapping data file 512 and a source mapping data file 514, according to various embodiments. As shown in FIG. 5, the system 500 includes a subsurface data platform 504, an application user interface 502, and a view model 510. Interactions between the application user interface 502 and the view model 501 utilize the user interface mapping data file 512, and interactions between the subsurface data platform 504 and the view model 510 utilize the source mapping data file 514, as described presently.

According to various embodiments, the view model 510 may be used according to the following non-limiting example steps.

(1) Define the user experience based on business requirement. The user experience engineer is free to propose a UI that best suits the business needs because the view model 510 provides flexibility.

(2) Identify the subsurface data platform services that will provide data for the user experience.

(3) Define the user interface mapping data file 512 and the source mapping data file 514 to create the view model. In general, the user interface mapping data file 512 defines a mapping between a user's controls and the view model field (e.g., table or tables). Further, in general, the source mapping data file 514 defines a mapping defines mapping between the subsurface data platform data source attribute and the view model field (e.g., table or tables).

The actions (1), (2), and (3) may be performed prior to an end user utilizing the application's user interface 502 for processing data from the subsurface data platform 504 using the view model 510. The action (4) may be performed during an end user's usage.

(4) Invoke a service of the view model 510 to get the relevant data. When view model service is called, it calls the appropriate service to fetch the actual data from the subsurface data platform 504. This action may include two parts: first, the view model service acquires the data from the subsurface data platform 504 data source using the source mapping data file 512, and second, the view model service uses the user interface mapping data file 514 to massage and return the data in the format specific to the user interface 502. Note that according to various embodiments, the user interface 502 can be directly bound to the response from the view model 510 to populate the data.

The following is a non-limiting example of a user interface mapping data file 512 in JSON format.

```
{
  "id": "wellviewer1",
  "mappingType": "viewermapping",
  "destinationVM": "wellvm",
  "attributeList": [
    {
      "attributename": "name",
      "displayName": "BOREHOLE NAME",
      "type": "string",
      "orderid": 1
    },
    {
      "displayName": "Spud Date",
      "attributename": "spud_date",
      "type": "date",
      "orderid": 3
    },
    {
      "attributename": "id",
      "type": "string",
      "key": true,
      "hidden": true
    },
    {
      "displayName": "Status",
      "attributename": "status".
      "type": "string",
      "orderid": 5
    }
  ]
}
```

Example fields in the above example user interface mapping data file 512 are described as follows. The "mappingType" field is for an identification of the type of mapping; possible values are "UImapping" or "sourceMapping." The "attributename" field is for an attribute name inside the view model 510 that will be mapped to the user interface 502. Thus, the "attributename" is for an identification internal to the view model 510. The "displayName" field is for the display name that is used in the user interface 502. The "type" field is an optional field for a data type of attribute. The "type" data field may perform data conversion if the type is different in view model 510, for example. The "orderid" field is an optional field that is used to define the order of the data columns as displayed in the user interface 502. The "hidden: data field is an optional data field that is used to show or hide the respective attribute on the user interface 502.

The following is a non-limiting example of a source mapping data file 514 in JSON format. By way of non-limiting example, the source mapping data file 514 is for an OSDU data platform as the subsurface data platform 504.

```
{
  "id": "wellvmmapping",
  "mappingType": "sourcemapping",
  "sourceKind": ["k1"],
  "OSDUDataService":"/Search/Query",
  "parameters": "\"kind\": \"*:*:*:*\", \"limit\": 5, \"query\": \"\"" ,
  "destinationVM": "wellvm",
  "attributeList": [
    {
      "source": "Name",
      "destination": "name"
    },
    {
      "source": "UWI",
      "destination": "UWI"
    },
```

-continued

```
    {
      "source": "id",
      "destination": "id"
    },
    {
      "source": "UBHI",
      "destination": "UBHI"
    },
  {
      "source" : "TOP_X",
      "destination" : "top_x",
      "GroupName" : "surfacexy"
    },
    {
      "source" : "TOP_Y",
      "destination" : "top_y",
      "GroupName" : "surfacexy"
    },
    {
      "source": "completiondate",
      "destination": "completion_date"
  "jsonquerypath":"
$.**.FacilityNameAiases[AliasNameTypeID='osdu:reference-data--
A1iasNameType:UniqueIdentifier:'].AliasName"
    }
  ]
}
```

Example fields in the above example source mapping data file 514 are described as follows. The "source" field is for an attribute name in the subsurface data platform 504. The "destination" field is for the attribute name in view model 510. The "mappingType" field is for the type of mapping; possible values are "UImapping" and "sourceMapping." The "OSDUDataService" field is for the subsurface data platform data service that will be invoked to get the actual data from the subsurface data platform 504. The "Parameters" field is for the parameters that will be passed while calling the OSDU data service. The "sourceKind" is for the data record type, e.g., well log, borehole, seismic, etc.

In the above source mapping data file 514, the "Jsonquerypath" includes the logic that is used to flatten the hierarchical data. The query resolves record values from an OSDU record into the view model flat hierarchy. Note that it can include custom attributes for different scenarios, e.g., if there is a composite attribute, then it can include "GroupName" to group multiple attributes.

Because the OSDU data platform, for example, is hierarchical, the view model of some embodiments flattens retrieved hierarchal records. For example, the view model 510 may store data in flat file format. According to some embodiments, the view model 510 flattens an OSDU record when it fetches the record. The logic to flatten the record can be a simple JSON path query (e.g., as shown above) or it can be a custom logic, based on the particular scenario.

Figure 6:
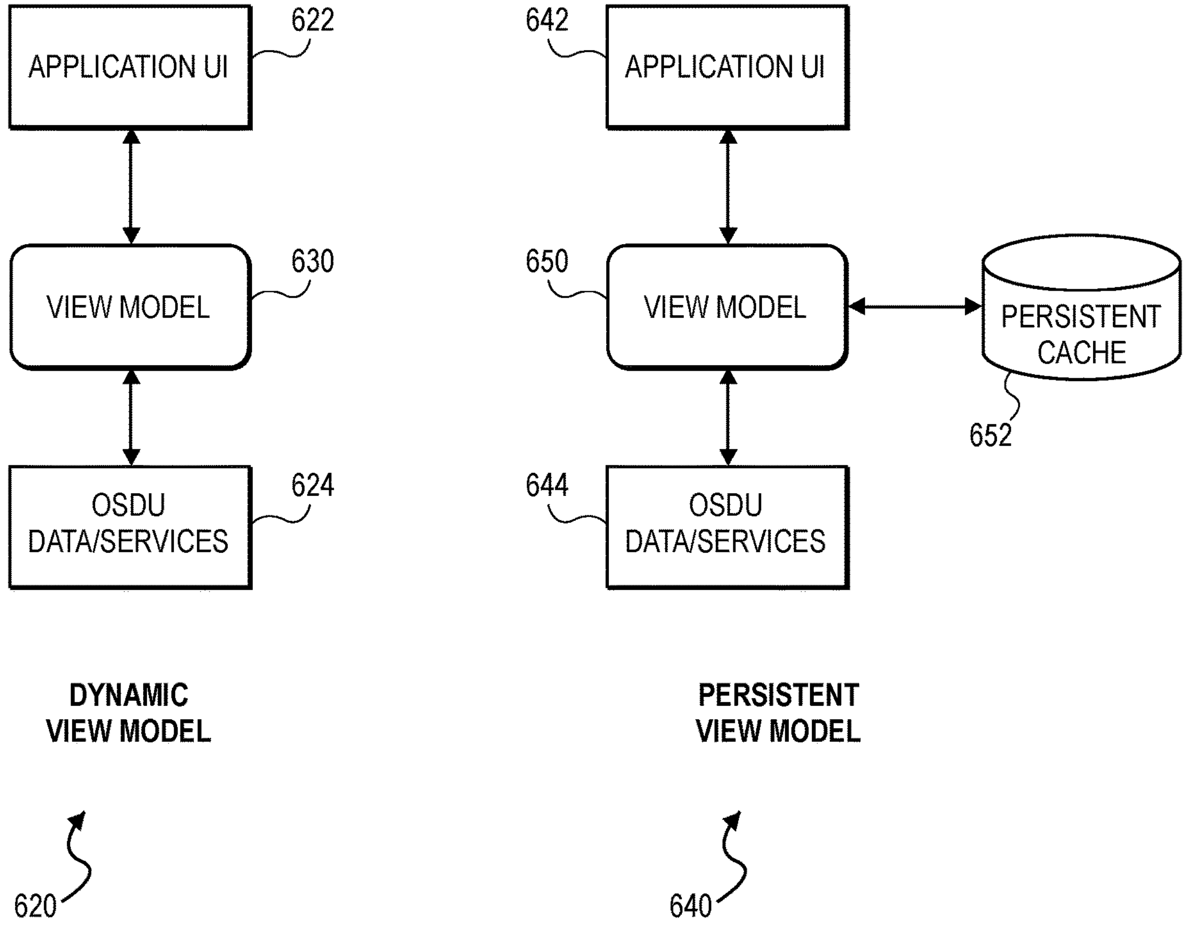
FIG. 6 schematically illustrates a dynamic view model and a persistent view model according to various embodiments.

FIG. 6 schematically illustrates a dynamic view model 620 and a persistent view model 640 according to various embodiments. In general, a view model according to various embodiments may be either a dynamic view model (e.g., 620) or a persistent view model (e.g., 640). A dynamic view model may store the query to fetch data from subsurface data platform services at runtime and may not store the actual data on its own. Rather, a dynamic view model may fetch the data from the subsurface data platform services at runtime. A dynamic view model may be useful when the data requirements for the application/UI are uncertain or when the data changes frequently.

By contrast, a persistent view model may query the subsurface data platform services based on the view model definition and store the data in a persistent storage. This allows the persistent view model to serve the data to the application/UI directly from its persistent storage, instead of calling the subsurface data platform service repeatedly. The persistent storage may be the temporary storage that works as a cache. When using a persistent view model, the application may obtain performance benefits due to the caching.

A persistent view model may be useful when the data requirements are well-defined and stable. By caching the data in persistent storage, a persistent view model can reduce the load on the subsurface data platform services and improve the overall performance of the application. The OSDU notification system, for example, allows a user to subscribe to data and/or metadata, and the OSDU notification system raises an event whenever there is a change in the data and/or metadata. A persistent view model can subscribe to the topic, and the data in the cache can be updated wherever there is any change (e.g., a new record, an update to an existing record, a deleted record, etc.). Thus, the OSDU notification system may be used to keep a persistent view model up to date, for embodiments that utilize ODSU for the subsurface data platform.

Overall, both types of view models have their own pros and cons. The choice of the particular view model type may depend on the specific needs and requirements of the application/UI.

Figure 7:
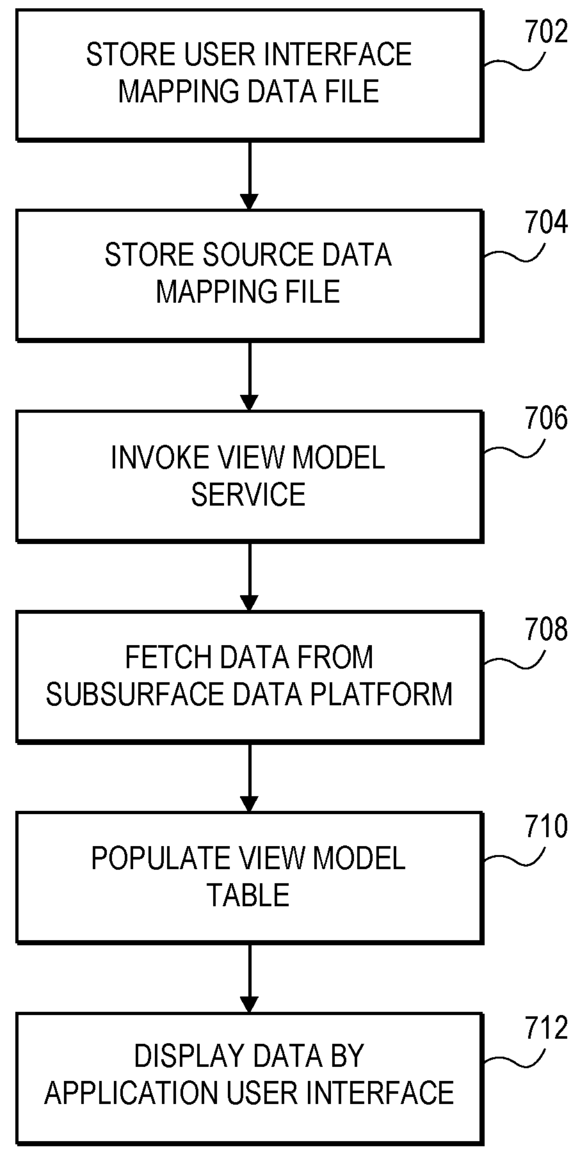
FIG. 7 is a flow diagram for a method of interfacing, using a view model, an application with a subsurface data platform.

FIG. 7 is a flow diagram for a method 700 of interfacing, using a view model, an application with a subsurface data platform. The method 700 may be performed by a computer that includes a non-transitory persistent memory and an electronic processor communicatively coupled to the non-transitory persistent memory.

At 702, the method 700 includes storing, in the non-transitory persistent memory, a user interface mapping data file. The user interface mapping data file may define correspondences between elements of a user interface of the application and view model attribute identifications. The user interface data file may be as shown and described herein in reference to FIG. 5, for example.

At 704, the method 700 includes storing, in the non-transitory persistent memory, a source mapping data file. The source mapping data file may define correspondences between view model attribute identifications and data of the subsurface data platform. The source data file may be as shown and described herein in reference to FIG. 5, for example.

At 706, the method 700 includes invoking, by the electronic processor, one or more view model services. The view model services may be as shown and described herein in reference to FIG. 5, for example.

At 708, the method 700 includes fetching data from the subsurface data platform based on the source mapping data file. The fetching may be done using one or more view model services.

At 710, the method 700 includes populating at least one view model table, based on the user interface mapping file, with data fetched from the subsurface data platform and formatted for the user interface of the application. The populating may be done using one or more view model services.

An example non-limiting use case according to various embodiments is described presently. Consider the following table.

TABLE

| Name | Spud Date | DATUMTYPE | Completion Date | Field name | logs count | Block name | No. of bore-holes | Block Name |
|---|---|---|---|---|---|---|---|---|
| L46/21-57 | 29 Nov. 1957 | Kelly Bushing | 7 Dec. 1957 | Newsham | 1598 | 3/27b | 2 | Amethyst East |
| L46/21-32 | 15 Mar. 1957 | Rotary Table | 24 Mar. 1957 | Helvellyn | 8793 | 47/9c | 3 | Carrack |
| L46/21-11 | 24 Dec. 1955 | Kelly Bushing | 19 Jan. 1956 | Hamilton North | 8793 | 48/17c | 1 | Pickerill |
| L47/16-11 | 4 Jul. 2003 | Kelly Bushing | 8 Oct. 2003 | Barque | 8934 | SK56a | 1 | Hamilton |

The Table depicts data from sample well records. According to the example use case, it may be desirable for an OSDU application to display these records in a UI, e.g., in the form shown by the Table. However, the wells represented by the data in the Table may not be of the same kind. For example, the well data stored in OSDU can be stored in record that have varying schema types, e.g., with the data stored in varying hierarchy levels. For example, some of the attribute/column values may arise from parent or child records. This means that the OSDU records for these wells do not directly, e.g., at the top level, contain all of the desired values. For example, the Field name and Block Name may not be directly available in a well record. Also, it may be desirable to display in the UI a record count of logs ("logs count") or boreholes ("number of boreholes") associated with the well. Further, it may be desirable for the application to include a hyperlink with a given record count, so that when the user clicks on the hyperlink the US displays the respective logs for the well. As shown in the Table, the data for the record counts "logs count" and "number of boreholes" may be formatted as such hyperlinks.

It is very challenging to build a UI display as shown in the Table, because it includes data from varying schema. For example, the data in the first four columns shown in the Table come from one type of record, and the data from the last four columns come from a different type of record. Generally, the application that is built on top of OSDU is directly bound to a search service, which is not flexible in drawing data from varying schema hierarchy levels. Further, it is not possible to add custom logic to get the data directly. Getting attributes from different OSDU records along with a count of records adds further complexity.

Various embodiments solve these and other problems using a view model. For the example use case, an embodiment may include a view model for the Table display. The view model may be independent of record kind, e.g., schema hierarchy level. An engineer may define user interface and source mapping data files. The view model may map data from different kinds of records to a common UI model. Thus, data from different record kinds and hierarchy levels may be provided in one or more view model tables. For example, a view model service may fetch the count of child/parent records and populate the same in the view model. The format of the view model table may be as shown in the Table, for example, which may be the same as the user interface display. With this approach, all the required data may be provided inside the view model in a flat format. The application user interface may simply bind with the view model to populate data on the user interface display.

Certain examples can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), flash memory, and magnetic or optical disks or tapes.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented using computer readable program instructions that are executed by an electronic processor.

These computer readable program instructions may be provided to a processor of a general-purpose computer, special purpose computer, or other programmable data processing apparatus to produce a machine, such that the instructions, which execute via the electronic processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on a user's computer, partly on the user's computer, as a stand-alone software package, partly on the user's computer and partly on a remote computer or entirely on the remote computer or server.

As used herein, the terms "A or B" and "A and/or B" are intended to encompass A, B, or {A and B}. Further, the terms "A, B, or C" and "A, B, and/or C" are intended to encompass single items, pairs of items, or all items, that is, all of: A, B, C, {A and B}, {A and C}, {B and C}, and {A and B and C}. The term "or" as used herein means "and/or."

As used herein, language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

While the invention has been described with reference to the exemplary examples thereof, those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of interfacing, using a view model, an application with a subsurface data platform, the method performed by a computer comprising a non-transitory persistent memory and an electronic processor communicatively coupled to the non-transitory persistent memory, the method comprising:

storing, in the non-transitory persistent memory, a user interface mapping data file, wherein the user interface mapping data file defines correspondences between elements of a user interface of the application and view model attribute identifications;

storing, in the non-transitory persistent memory, a source mapping data file, wherein the source mapping data file defines correspondences between the view model attribute identifications and data of the subsurface data platform; and invoking, by the electronic processor, one or more view model services, wherein the invoking the one or more view model services fetches data from the subsurface data platform based on the source mapping data file, and wherein the invoking the one or more view model services populates at least one view model table in the user interface of the application, based on the user interface mapping data file, with the data fetched from the subsurface data platform and formatted for the user interface of the application, wherein the one or more view model services is configured to:

fetch the data from the subsurface data platform as corresponding to different kinds of records having varying schema hierarchy levels;

flatten the data fetched from the subsurface data platform to generate flattened data as formatting of the data fetched from the subsurface data platform for the user interface of the application; and provide the flattened data to the user interface of the application via a bind between the user interface of the application with the view model to populate the user interface with the flattened data without knowledge of the subsurface data platform by the user interface of the application.

2. The method of claim 1, wherein the subsurface data platform comprises an open subsurface data universe.

3. The method of claim 1, further comprising displaying, by the user interface of the application, data from the at least one view model table.

4. The method of claim 1, wherein the subsurface data platform stores data using hierarchal schemes corresponding to the varying schema hierarchy levels, and wherein the at least one view model table comprises a flat file.

5. The method of claim 1, wherein the invoking the one or more view model services fetches the data fetched from the subsurface data platform during runtime of the application without ever persistently storing the data fetched from the subsurface data platform.

6. The method of claim 1, further comprising persistently storing the data fetched from the subsurface data platform, wherein the application obtains the data fetched from the subsurface data platform from persistent storage after an initial execution of the application without fetching the data fetched from the subsurface data platform again.

7. The method of claim 1, wherein the source mapping data file specifies subsurface data platform query handling.

8. The method of claim 1, wherein the user interface of the application is directly bound to the at least one view model table via the bind.

9. The method of claim 1, further comprising:

defining a user experience for the user interface of the application; and generating the user interface mapping data file based on the user experience.

10. A non-transitory computer readable medium comprising instructions that, when executed by an electronic processor, configure the electronic processor to interface an application with a subsurface data platform, using a view model, by performing actions comprising:

invoking, by the electronic processor, one or more view model services, wherein the invoking the one or more view model services fetches data from the subsurface data platform based on a source mapping data file stored in a non-transitory persistent memory, wherein the source mapping data file defines correspondences between view model attribute identifications and the data of the subsurface data platform, and wherein the invoking the one or more view model services populates at least one view model table in a user interface of the application, based on a user interface mapping data file, with data fetched from the subsurface data platform and formatted for the user interface of the application, wherein the user interface mapping data file is stored in a non-transitory persistent memory, wherein the user interface mapping data file defines correspondences between elements of a user interface of the application and the view model attribute identifications, and wherein the one or more view model services is configured to:

fetch the data from the subsurface data platform as corresponding to different kinds of records having varying schema hierarchy levels;

flatten the data fetched from the subsurface data platform to generate flattened data as formatting of the data fetched from the subsurface data platform for the user interface of the application; and provide the flattened data to the user interface of the application via a bind between the user interface of the application with the view model to populate the user interface with the flattened data without knowledge of the subsurface data platform by the user interface of the application.

11. The non-transitory computer readable medium of claim 10, wherein the subsurface data platform comprises an open subsurface data universe.

12. The non-transitory computer readable medium of claim 10, wherein the actions further comprise displaying, by the user interface of the application, data from the at least one view model table.

13. The non-transitory computer readable medium of claim 10, wherein the subsurface data platform stores data using hierarchal schemes corresponding to the varying schema hierarchy levels, and wherein the at least one view model table comprises a flat file.

14. The non-transitory computer readable medium of claim 10, wherein the invoking the one or more view model services fetches the data fetched from the subsurface data platform during runtime of the application without ever persistently storing the data fetched from the subsurface data platform.

15. The non-transitory computer readable medium of claim 10, wherein the actions further comprise persistently storing the data fetched from the subsurface data platform, wherein the application obtains the data fetched from the subsurface data platform from persistent storage after an initial execution of the application without fetching the data fetched from the subsurface data platform again.

16. The non-transitory computer readable medium of claim 10, wherein the source mapping data file specifies subsurface data platform query handling.

17. The non-transitory computer readable medium of claim 10, wherein the user interface of the application is directly bound to the at least one view model table via the bind.

18. A system for interfacing, using a view model, an application with a subsurface data platform, the system comprising:

a non-transitory persistent memory, wherein the non-transitory persistent memory stores a user interface mapping data file, wherein the user interface mapping data file defines correspondences between elements of a user interface of the application and view model attribute identifications and defines a first mapping between user controls of the user interface of the application and a view model field comprising at least one view model table, and wherein the non-transitory persistent memory stores a source mapping data file, wherein the source mapping data file defines correspondences between the view model attribute identifications and data of the subsurface data platform and defines a second mapping between a data attribute of the of the subsurface data platform and the view model field; and an electronic processor communicatively coupled to the non-transitory persistent memory, wherein the non-transitory persistent memory comprises instructions that, when executed by the electronic processor, configure the electronic processor to perform actions comprising:

invoking, by the electronic processor, one or more view model services, wherein the invoking the one or more view model services fetches the data from the subsurface data platform based on the source mapping data file, and wherein the invoking the one or more view model services populates the at least one view model table in the user interface of the application, based on the user interface mapping data file, with the data fetched from the subsurface data platform and formatted for the user interface of the application, wherein the one or more view model services is configured to:

fetch the data from the subsurface data platform as corresponding to different kinds of records having varying schema hierarchy levels;

flatten the data fetched from the subsurface data platform to generate flattened data as formatting of the data fetched from the subsurface data platform for the user interface of the application; and provide the flattened data to the user interface of the application via a bind between the user interface of the application with the view model to populate the user interface with the flattened data without knowledge of the subsurface data platform by the user interface of the application.

* * * * *